(12) United States Patent
Yu et al.

(10) Patent No.: US 9,392,170 B2
(45) Date of Patent: Jul. 12, 2016

(54) MULTI-MODE CAMERA MODULE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jun-Hui Yu, Shenzhen (CN); Shin-Wen Chen, New Taipei (TW); Shu-Sheng Peng, Shenzhen (CN); Yong Li, Shenzhen (CN); Dai-Peng Zhu, Shenzhen (CN); Chien-Liang Chou, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/694,518

(22) Filed: Apr. 23, 2015

(65) Prior Publication Data

US 2016/0065850 A1    Mar. 3, 2016

(30) Foreign Application Priority Data

Sep. 1, 2014    (CN) .......................... 2014 1 0439527

(51) Int. Cl.
*H04N 5/232* (2006.01)
*H04N 5/225* (2006.01)
*G02B 7/02* (2006.01)
*G02B 5/20* (2006.01)
*G02B 7/00* (2006.01)

(52) U.S. Cl.
CPC ............ *H04N 5/23245* (2013.01); *G02B 5/208* (2013.01); *G02B 7/006* (2013.01); *G02B 7/02* (2013.01); *H04N 5/2254* (2013.01)

(58) Field of Classification Search
CPC ....................... H04N 5/23245; H04N 5/22554
See application file for complete search history.

(56) References Cited

U.S. PATENT DOCUMENTS

| 2012/0194728 A1* | 8/2012 | Kim | .......................... G02B 3/00 348/342 |
| 2015/0334316 A1* | 11/2015 | Wang | ..................... H04N 5/332 348/143 |

* cited by examiner

*Primary Examiner* — James Hannett
(74) *Attorney, Agent, or Firm* — ScienBiziP, P.C.

(57) ABSTRACT

Camera module with switchable light filters includes a lens module, a bearing rotating device, a visible light filter, and an infrared light filter. The bearing rotating device includes a rotating shaft, at least one guiding stick, and a bearing plate. The rotating bearing plate holds the two filters and defines an arcuated guiding slot. The circle center of the arcuated guiding slot is the rotating shaft. A visible light filter and an infrared light filter are switchable, their movement being governed by the guiding stick and the guiding slot, to respective alignment with an optical axis of the lens module. The camera module can rotate the bearing plate to switch the infrared filter for the visible filter where the acquisition of infrared light is required.

20 Claims, 3 Drawing Sheets

MULTI-MODE CAMERA MODULE

FIELD

The subject matter herein generally relates to an image-capturing device.

BACKGROUND

In the field of photography, the camera module mainly acquires visible light. A camera module may have filters against ultraviolet and infrared light to avoid the ultraviolet and infrared light affecting the image quality. However, a mobile device may have an iris recognition function embedded in the camera module and capturing infrared light of 800-850 nm wavelength is necessary for the iris recognition feature to function.

BRIEF DESCRIPTION OF THE DRAWINGS

Implementations of the present technology will now be described, by way of example only, with reference to the attached figures.

DETAILED DESCRIPTION

Figure 1:
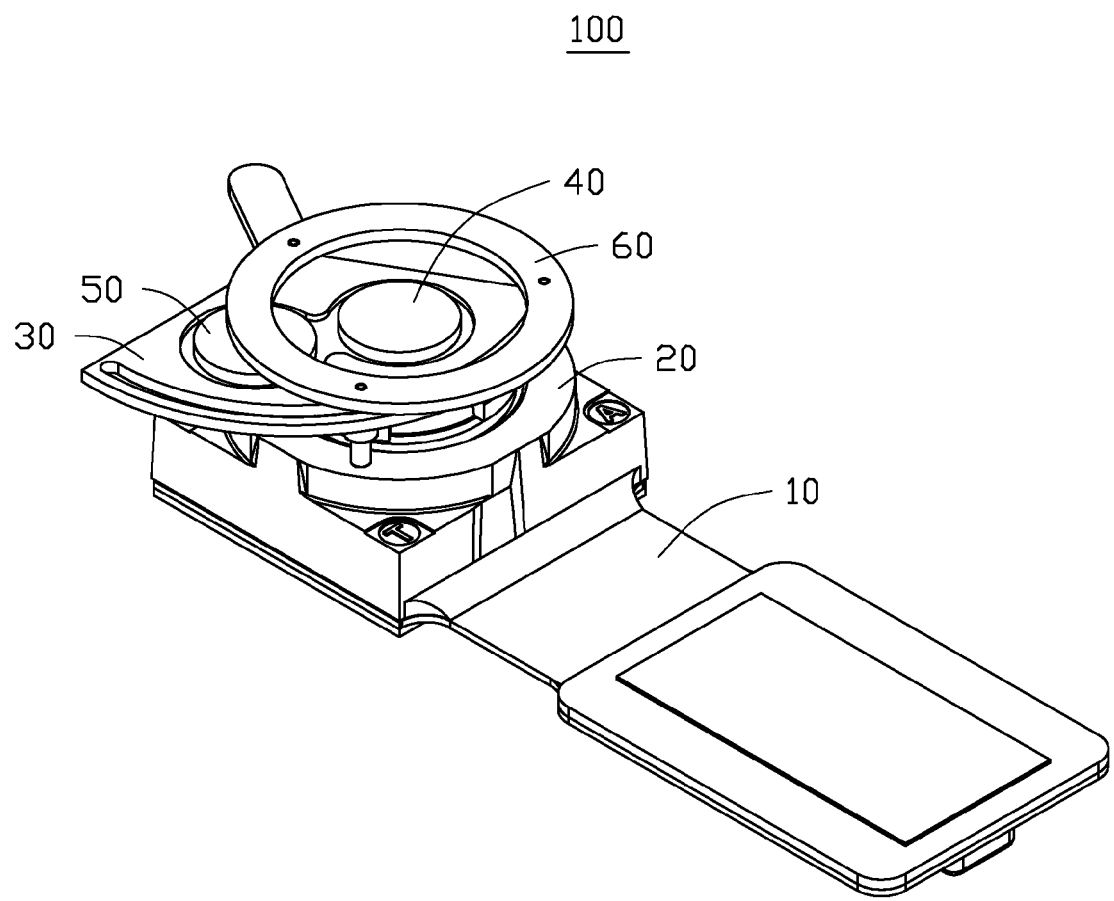
FIG. 1 is an isometric view of a camera module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
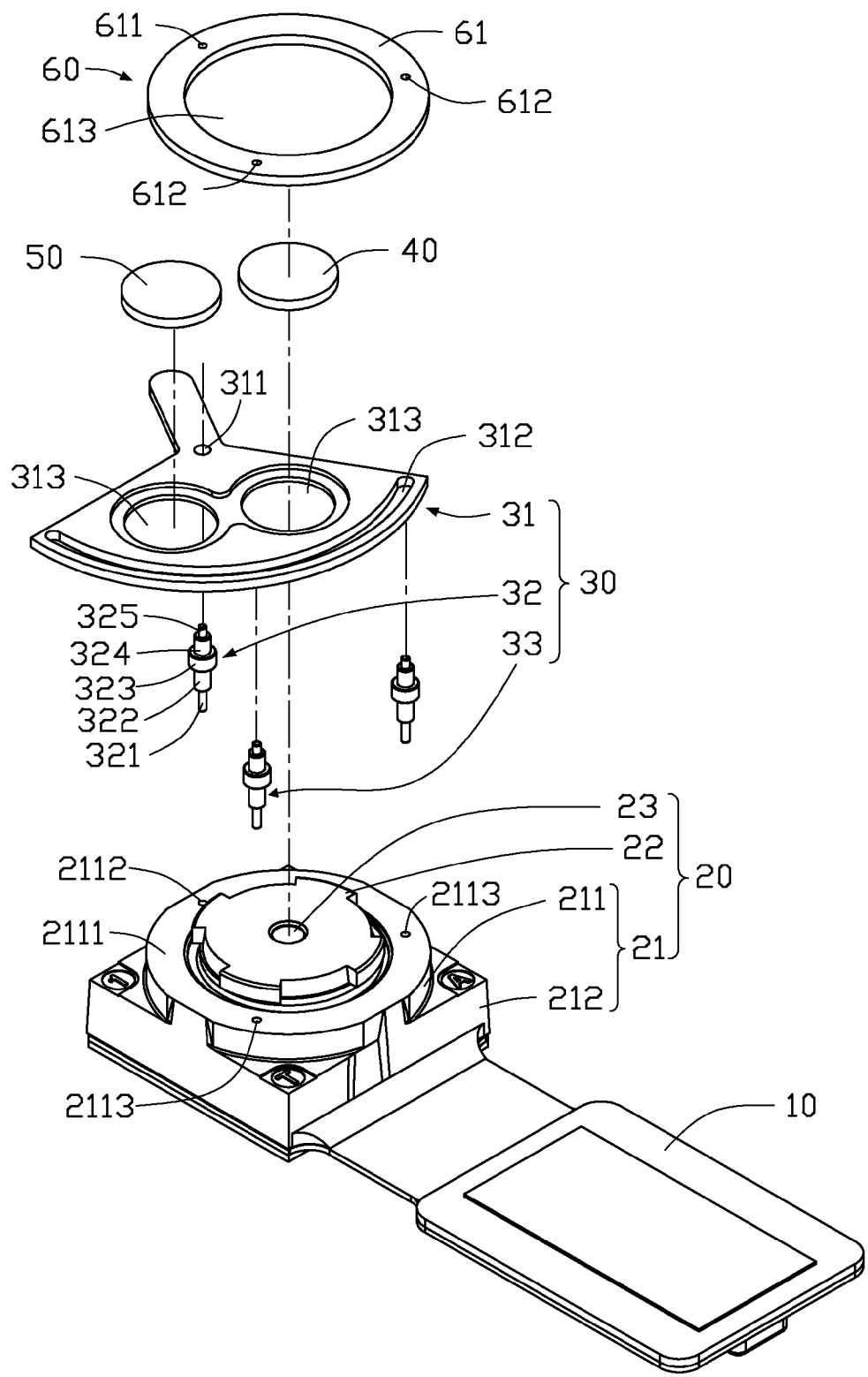
FIG. 2 is an isometric, exploded view of the camera module in FIG. 1 according to the present disclosure.

FIG. 1 and FIG. 2 illustrate a camera module 100 which includes a power circuit board 10, an image sensor (not shown) located on the power circuit board 10, a lens module 20, a bearing rotating device 30, a visible light filter 40, an infrared light filter 50, and a fixing plate 60.

The power circuit board 10 may be a flexible printed circuit board, a rigid printed circuit board, or a rigid-flexible board.

The image sensor senses light passing through the visible light filter 40 and the infrared light filter 50 and converts the optical signals into electrical signals.

The lens module 20 includes a lens holder 21, a lens barrel 22, and at least one lens 23 accommodated in the lens barrel 22.

The lens holder 21 includes a barrel portion 211 and a base portion 212. The barrel portion 211 is located on the base portion 212. The barrel portion 211 is used for receiving the lens barrel 22, and the base portion 212 is used for receiving the image sensor. The lens barrel 22 and the image sensor are face-to-face and are both aligned with the optical axis of the lens. The lens holder 21 is located on the power circuit board 10.

The barrel portion 211 includes a first surface 2111 located at the object side. The first surface 2111 defines a first positioning blind hole 2112 and two second positioning blind holes 2113. The distances between the first positioning blind hole 2112 and each of the two second positioning blind holes 2113 are equal.

The bearing rotating device 30 includes a bearing plate 31, a rotating shaft 32, and two guiding sticks 33.

The bearing plate 31 is a fan-shaped thin plate, and defines a first positioning hole 311, an arcuated guiding slot 312, and two receiving apertures 313. The first positioning hole 311 is mated with the rotating shaft 32. The two receiving apertures 313 respectively receive the visible light filter 40 and the infrared light filter 50. The arcuated guiding slot 312 and the two receiving apertures 313 penetrate though the bearing plate 31. The arcuated guide slot 312 follows an arc of a circle with the first positioning hole 311 as the center of the circle. The geometric centers of two receiving apertures 313 define another circular path with the center at the first positioning hole 311. Both of the circles therefore have the same center and are concentric. When the bearing plate 31 rotates to a specific angle, guided by the guiding sticks 33, one of the two receiving apertures 313 has a position aligned with the optical axis of the lens 23.

The rotating shaft 32 and the two guiding sticks 33 are located on the lens module 20 and are used to support and guide the rotating plate 31. The rotating shaft 32 integrates with the bearing plate 31 to support the rotation of the bearing plate 31. The two guiding sticks 33 and the guiding slot 312 are mated to guide the rotation angle and orientation of the bearing plate 31. In addition, the two guiding sticks 33 are respectively mated with the two second positioning blind holes 2113.

The rotating shaft 32 includes a first portion 321, a second portion 322, a third portion 323, a fourth portion 324, and a fifth portion 325. The size of the second portion 322 is slightly larger than the size of the first portion 321, the size of the third portion 323 is slightly larger than the size of the second portion 322, the size of the fourth portion 324 is slightly smaller than the size of the third portion 323, and the size of the fifth portion 325 is slightly smaller than the size of the fourth portion 324.

The visible light filter 40 is received in one of the two receiving apertures 313 and only allows the passage of visible light. The infrared light filter 50 is received in another one of the two receiving apertures 313, and only allows the passage of infrared light. When the bearing plate 31 is rotated to a specific angle, one of the visible light filter 40 and the infrared light filter 50 is aligned with the lens 23. The visible light filter 40 and the infrared light filter 50 are attached within the receiving apertures 313 by using adhesive selected from at least one of double-sided tape, vinyl, or UV adhesive glue, or similar. The infrared light filter 50 can be selected to have a wavelength range between 800 nm and 850 nm, appropriate for the iris recognition function.

The fixing plate 60 is used for fixing the bearing plate 31 to prevent any wobbling by the bearing rotating device 30.

The fixing plate 60 is a hollow annular thin plate and includes a second surface 61 away from the bearing plate 31.

The second surface 61 has a second position hole 611, two third positioning holes 612, and an opening 613. The second position hole 611 corresponds to the first positioning blind hole 2112, and the two third positioning holes 612 correspond to the two second positioning blind holes 2113. The visible light filter 40 and the infrared light filter 50 can be exposed to the opening 613 when the bearing plate 31 is rotated to a specific angle.

The first portion 321 of the rotating shaft 32 is received in the first positioning blind hole 2112, the fourth portion 324 of the rotating shaft 32 is received in the first positioning holes 311, and the fifth portion 325 of the rotating shaft 32 is received in the second positioning hole 611. Since the fourth portion 324 of the rotating shaft 32 is received in the first position holes 311, the center of the circle for the arcuated guiding slot 312 is also located at the rotating shaft 32. In addition, the diameter of the second positioning hole 611 is smaller than the diameter of the first positioning hole 311, and the diameter of the first positioning blind hole 2112 is smaller than the diameter of the first positioning hole 311.

The first portions of the two guiding sticks 33 are respectively received in the two second positioning blind holes 2113. The fourth portions 324 of the two guiding sticks 33 are received in the arcuated guiding slot 312, and the fifth portions 325 of the two guiding sticks 33 are received in the two third positioning holes 612.

In other embodiments, the shape of the bearing plate 31 can be other than fan-shaped, it can be rectangular, trapezoidal, circular, elliptical, or other. The number of the guiding sticks 33 is not limited to two, the structures of the rotating shaft 32 and the guiding sticks 33 can be different, and their respective structures are not limited to the above-described configuration, as long as they can support, rotate, and guide the rotation of the bearing plate 31. The shape of the fixing plate 60 is not limited to being an annular plate.

Figure 3:
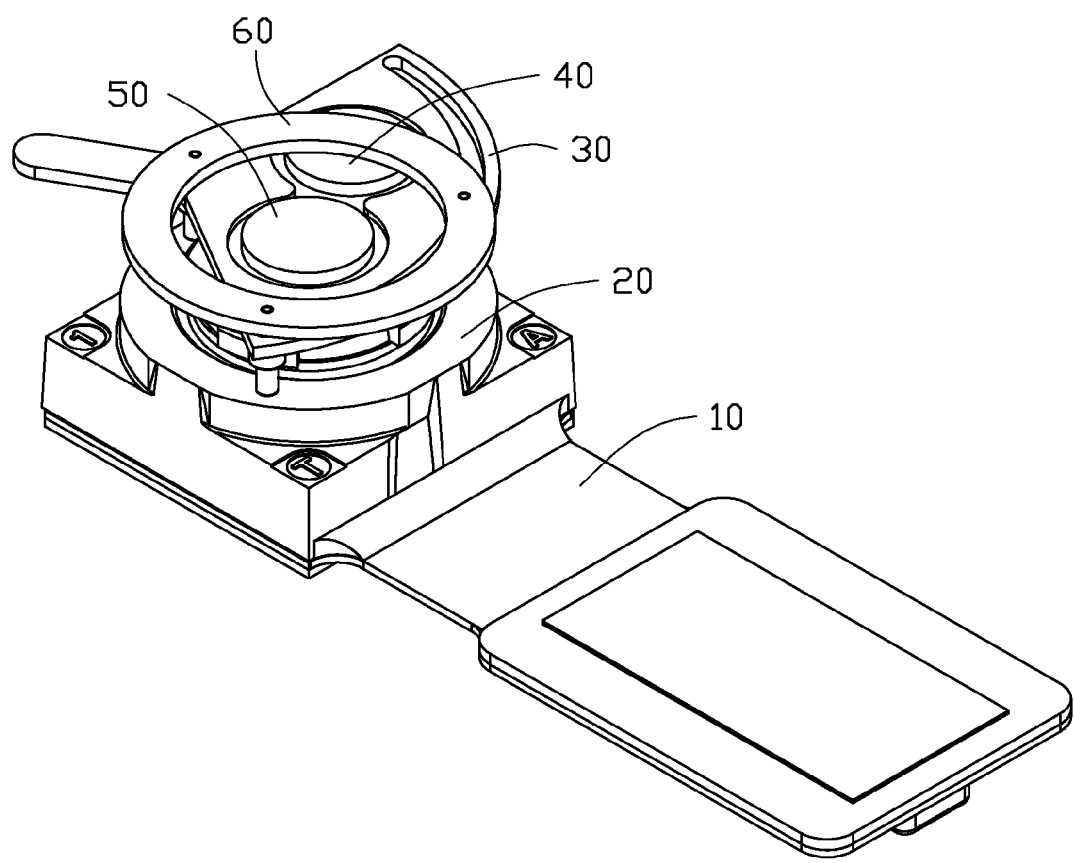
FIG. 3 is an isometric view of a camera module in FIG. 1 rotating to a different filter, according to the present disclosure.

FIG. 3 illustrates that the camera module 100 is employing an infrared filter as the bearing plate 31 is rotated to a specific angle. When the camera module 100 has different photographic demand, the bearing plate 31 can be rotated to switch the filters, to either the visible light filter 40 or the infrared light filter 50. In addition, the camera module 100 can use an external micro-motor or a manipulator to rotate the bearing plate 31 in addition to a manual switching operation. In the present embodiment, the bearing plate switches the different filters manually.

In the present embodiment, the rotating shaft 32 is integrated with the first positioning blind hole 2112, the first positioning hole 311 and the second positioning hole 611. The two rotating sticks 33 are integrated with the second positioning blind holes 2113, the arcuated guiding slot 312, and two third positioning holes 612. Both of the rotating shaft 32 and two rotating sticks 33 are used for positioning and supporting the bearing rotating device 31. In other embodiments, the rotating shaft 32 can be formed integrally with the first positioning hole 311, as long as the bearing plate 31 remains rotatable.

The embodiments shown and described above are only examples. Many details are often found in the art such as the other features of a camera module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera module comprising:
   a lens module including at least one lens, a lens barrel to receive the at least one lens, and a lens holder, the lens holder comprises a base portion and a barrel portion located on the base portion, the barrel portion has a first surface located at the object side, the first surface defines a first positioning blind hole and two second positioning blind holes;
   a visible light filter;
   an infrared light filter; and
   a bearing rotating device including a rotating shaft, at least one guiding stick to guide the rotation angle of the rotating shaft, and a bearing plate to rotate with the rotating shaft;
   the rotating shaft and the at least one guiding stick are positioned on the lens module and configured to support the bearing plate;
   the bearing plate defining a first positioning hole, an arcuated guiding slot and two receiving apertures, the arcuated guiding slot is located at a circle with a circle center at the center of the rotating shaft;
   the at least one guiding stick and the guiding slot are mated to guide the rotation angle of the bearing plate, each of the two receiving apertures having a geometry center located at a circular path with a center of the circle at the center of the rotating shaft;
   wherein the visible light filter is received in one of the two receiving apertures and the infrared light filter is received in another one of the two receiving apertures;
   wherein one of the two receiving apertures is aligned with the optical axis of the lens when the bearing plate is rotated to the position of the at least one guiding stick.

2. The camera module of claim 1, wherein the camera module further comprises:
   a power circuit board selected from at least one of a flexible printed circuit board, a rigid printed circuit board or rigid-flex PCB;
   an image sensor located on the power circuit board, the image sensor is used for sensing the light passing through the visible light filter or the infrared light filter to convert optical signals into electrical signals; and
   a fixing plate, the fixing plate is a hollow plate for engaging the bearing plate to prevent the wobbles produced from the bearing rotating device.

3. The camera module of claim 2, wherein the fixing plate further comprising:
   a second surface away from the bearing plate, the second surface defines a second position hole corresponding to the first positioning blind hole;
   two third positioning holes corresponding to the two second positioning blind holes; and
   an opening,
   wherein one of the visible light filter and the infrared light filter is exposed to the opening when the bearing plate is rotated to a specific angle guide by the at least one guiding stick.

4. The camera module of the claim 3, wherein the rotating shaft integrated with the first positioning blind hole, the first positioning hole and the second positioning hole, and the at least one guiding sticks integrated with the second positioning blind hole, the arcuated guiding slot and two third positioning holes, are used for positioning and supporting the bearing rotating device.

5. The camera module of the claim 1, wherein the distances between the first positioning blind hole and each of the two second positioning blind holes are equal.

6. The camera module of the claim 1, wherein the arcuated guiding slot and the two receiving apertures penetrate though the bearing plate.

7. The camera module of the claim 1, wherein the visible light filter and the infrared light filter are attached respectively within the two receiving apertures with an adhesive, the adhesive is selected from at least one of double-sided tapes, vinyl, and UV adhesive glues.

8. The camera module of the claim 1, wherein the bearing plate is rotated by an external micro-motor.

9. The camera module of the claim 1, wherein the bearing plate is rotated by a mechanical manipulation mode or a manual mode.

10. The camera module of the claim 1, wherein the diameter of the first positioning blind hole is small than the diameter of the first positioning hole.

11. The camera module of the claim 1, wherein the diameter of the second positioning hole is small than the diameter of the first positioning hole.

12. The camera module of the claim 1, wherein the infrared light filter has a wavelength range to cover the light from 800 nm to 850 nm.

13. A camera module comprising:
  a lens module including at least one lens, a lens barrel and a lens holder, the lens holder comprises a base portion and a barrel portion located on the base portion, the barrel portion has a first surface located at the object side, the first surface defines a first positioning blind hole and two second positioning blind holes;
  a visible light filter;
  an infrared light filter;
  a bearing rotation device comprising:
    a rotating shaft;
    at least one guiding stick to guide the rotation angle of the rotating shaft; and
    a bearing plate to rotate with the rotating shaft;
  the rotating shaft and the at least one guiding stick are positioned on the lens module and configured to support the bearing plate;
  the bearing plate defining a first positioning hole, an arcuated guiding slot and two receiving apertures, the arcuated guiding slot is located at a circle with a circle center at the center of the rotating shaft;
  the at least one guiding stick and the guiding slot are mated to guide the rotation angle of the bearing plate, each of the two receiving apertures having a geometry center located at a circular path with a center of the circle at the center of the rotating shaft; and
  a fixing plate used to engage the bear plate and prevent the wobbles produced from the bearing rotating device,
  wherein the visible light filter is received in one of the two receiving apertures and the infrared light filter is received in another one of the two receiving apertures;
  wherein one of the two receiving apertures having a position aligned with the optical axis of the lens when the bearing plate is rotated to a specific angle guided by the at least one guiding stick.

14. The camera module of claim 13, wherein the camera module further comprises:
  a power circuit board selected from at least one of a flexible printed circuit board, a rigid printed circuit board or rigid-flex PCB; and
  an image sensor located on the power circuit board, the image sensor is used for sensing the light passing through the visible light filter or the infrared light filter to convert optical signals into electrical signals.

15. The camera module of claim 13, wherein the fixing plate further comprising:
  a second surface away from the bearing plate, the second surface defines a second position hole corresponding to the first positioning blind hole;
  two third positioning holes corresponding to the two second positioning blind holes; and
  an opening,
  wherein one of the visible light filter and the infrared light filter is exposed to the opening when the bearing plate is rotated to a specific angle guide by the at least one guiding stick.

16. The camera module of the claim 13, wherein the distances between the first positioning blind hole and each of the two second positioning blind holes are equal.

17. The camera module of the claim 13, wherein the visible light filter and the infrared light filter are attached respectively within the two receiving apertures with an adhesive, the adhesive is selected from at least one of double-sided tapes, vinyl, and UV adhesive glues.

18. The camera module of the claim 13, wherein the bearing plate is rotated by an external micro-motor.

19. The camera module of the claim 13, wherein the bearing plate is rotated by a mechanical manipulation mode or a manual mode.

20. The camera module of the claim 13, wherein the infrared light filter has a wavelength range to cover the light from 800 nm to 850 nm.

* * * * *